(12) United States Patent
Murphy

(10) Patent No.: US 6,571,001 B2
(45) Date of Patent: *May 27, 2003

(54) SYSTEM FOR DETECTING PHOTOCOPIED OR LASER-PRINTED DOCUMENTS

(75) Inventor: Stephen C. Murphy, Payette, ID (US)

(73) Assignee: Micron Technology, Inc., Boise, ID (US)

( * ) Notice: Subject to any disclaimer, the term of this patent is extended or adjusted under 35 U.S.C. 154(b) by 86 days.

This patent is subject to a terminal disclaimer.

(21) Appl. No.: 09/799,790

(22) Filed: Mar. 5, 2001

(65) Prior Publication Data

US 2002/0037093 A1 Mar. 28, 2002

Related U.S. Application Data

(63) Continuation of application No. 09/095,852, filed on Jun. 10, 1998, now abandoned.

(51) Int. Cl.[7] .................................................. G06K 9/00
(52) U.S. Cl. ..................... 382/112; 348/127; 250/559.4
(58) Field of Search ............................... 382/112, 172, 382/175, 100; 250/559.4; 700/130; 348/127

(56) References Cited

U.S. PATENT DOCUMENTS

| | | | |
|---|---|---|---|
| 5,018,767 A | 5/1991 | Wicker | 283/67 |
| 5,367,577 A | 11/1994 | Gotaas | 382/7 |
| 5,495,929 A | 3/1996 | Batalianets et al. | 194/207 |
| 5,530,772 A | 6/1996 | Storey | 382/135 |
| 5,533,144 A | 7/1996 | Fan | 382/135 |
| 5,537,486 A | 7/1996 | Stratigos et al. | 382/137 |
| 5,576,811 A | 11/1996 | Kobayashi et al. | 355/246 |
| 5,838,814 A | 11/1998 | Moore | 382/115 |
| 6,011,857 A | 1/2000 | Sowell et al. | 382/100 |
| 6,400,834 B1 * | 6/2002 | Murphy | 283/114 |

* cited by examiner

Primary Examiner—Jayanti K. Patel
Assistant Examiner—Barry Choobin
(74) Attorney, Agent, or Firm—Dorsey & Whitney LLP

(57) ABSTRACT

A system for distinguishing photocopied or laser-printed documents from original documents produced by offset printing, handwriting, or typewriting. The system scans a document at low-resolution and at high-resolution to produce a low-resolution and a high-resolution matrix representation of the presence or absence of ink or toner at discrete locations on the surface of the document. Printed regions detected by the system at low-resolution are used to mask regions of the high-resolution matrix representation from the analysis. The remaining unmasked regions of the high-resolution matrix representation are analyzed by the system to detect discrete microdots uniformly distributed within those regions. The presence of microdots on the surface of the document indicates that the document was produced as a photocopied or a laser-printed duplicate.

30 Claims, 7 Drawing Sheets

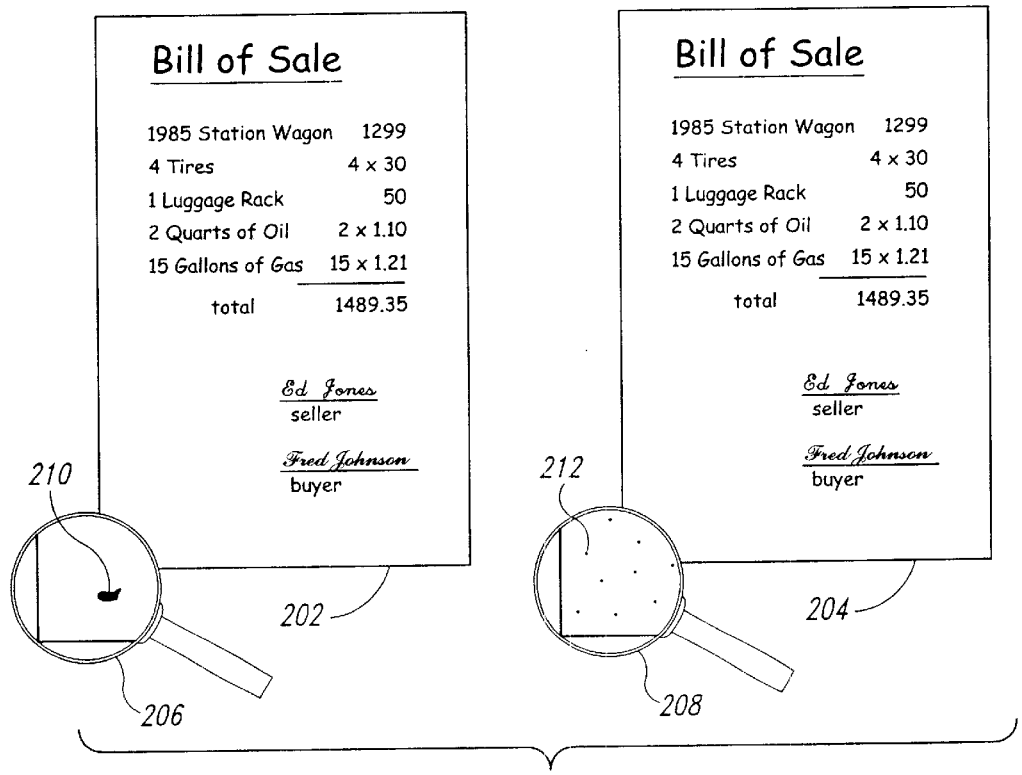

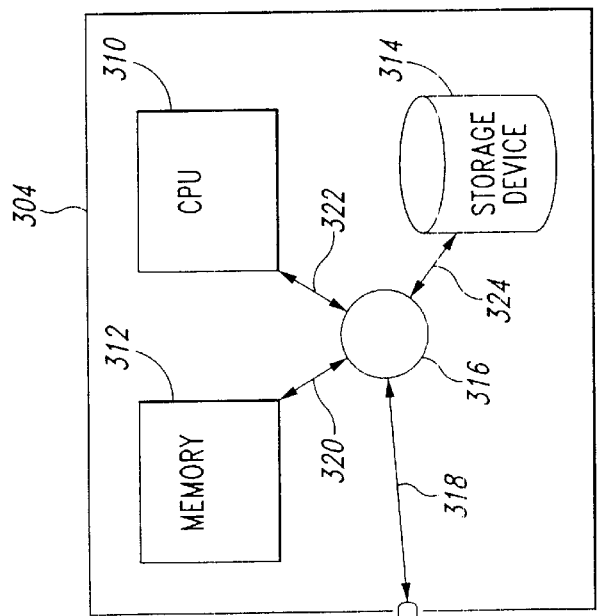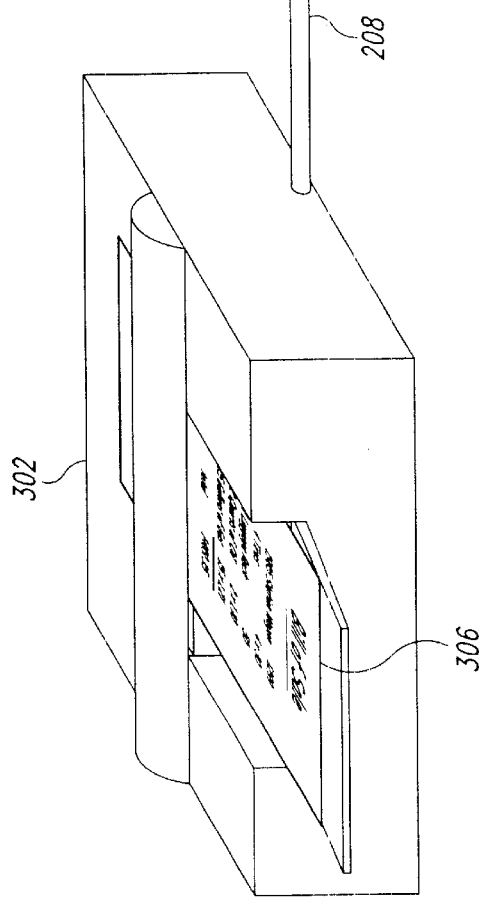
Fig. 3

SYSTEM FOR DETECTING PHOTOCOPIED OR LASER-PRINTED DOCUMENTS

CROSS REFERENCE TO RELATED APPLICATION

This application is a Continuation of U.S. patent application Ser. No. 09/095,852, filed Jun. 10, 1998 now abandoned.

TECHNICAL FIELD

The present invention relates to the authentication of printed documents and, in particular, to a system that distinguishes original printed documents from photocopied or laser-printed duplicates of printed documents.

BACKGROUND OF THE INVENTION

The large variety of different types of paper documents used in commercial, governmental, and private transactions can be broadly classified into two categories. In the first category are original documents produced by offset printing, handwriting, typewriting, ink jet printers, dot matrix or other impact printers, thermal and thermal transfer printers, pen-based plotters, and other such methods. The second category of paper documents includes duplicates or copies of original documents produced by photocopy machines or laser printers.

Photocopying and laser printing technologies have greatly improved in quality and capabilities in recent years. High-resolution color printers are, for example, of sufficient quality to be used by paper currency counterfeiters. Because monetary values and legal rights are frequently associated with original documents, but not with copies or duplicates of those documents, it is very important for those holding or receiving transactional documents to be able to distinguish original documents from copies of original documents. However, because of technological advances in photocopying and laser printing, it is becoming increasingly difficult for these holders and receivers of documents to distinguish original documents from copies.

FIG. 1 introduces an example of the problem of distinguishing an original document from a copy that will be used below in the Detailed Description of the Invention. FIG. 1 shows an original bill of sale 102 and a photocopy of the original bill of sale 104 produced by a high quality, high-resolution color printer. To the naked eye, there is no perceptible difference between the original bill of sale 102 and the copy 104.

There are many reasons why a holder or receiver of the bill of sale might wish to distinguish the original bill of sale from a copy. A holder of a bill of sale might, for example, be able to present the bill of sale to the seller in order to receive a rebate, a discount on a subsequent purchase, or a refund for damaged or faulty goods. It is important for a seller or merchant to be able to distinguish the original bill of sale from a copy to avoid paying out multiple refunds, discounts, or rebates for a single purchase. The holder of a bill of sale may wish to obtain some further document or authentication based on the original bill of sale. For example, the purchaser of a car may wish to obtain title to a car by presenting an original bill of sale to a government office. Presenting a copy or duplicate bill of sale may possibly constitute fraud. The holder of the bill of sale may wish to authenticate the bill of sale to avoid possibly committing fraud, and the receiving government office may wish to authenticate the bill of sale in order to avoid licensing the car to someone other than the owner.

Besides authentication, there are other reasons for which it may be useful to distinguish laser-printed or photocopied documents from original documents. For example, a laser printer or photocopy machine might send documents that have been previously laser-printed or photocopied through a different paper path than an original document in order to avoid jamming. A need has therefore been recognized for a system that can faithfully and automatically distinguish an original document from a photocopied or laser-printed document.

SUMMARY OF THE INVENTION

The present invention provides a system for distinguishing laser-printed or photocopied documents from original documents provided by offset printing, handwriting, typewriting, and other such methods. In one embodiment of the present invention, a document is scanned with an optical scanner at low-resolution and again at high-resolution. Optical scanning provides a two-dimensional matrix, or grid, in which each cell or position corresponds to a physical position on the surface of the document and each cell contains one of two values that indicate whether ink or toner was detected by the scanner at that position on the document. Those sections of the high-resolution matrix that correspond to blank or white space in the low-resolution matrix are then computationally analyzed to detect small, randomly-spaced microdots that appear only at high-resolution. These small, randomly-spaced microdots are present on photocopied or laser-printed documents, but not on original documents. Those documents that exhibit small, randomly-spaced microdots are thus identified as photocopied, or laser-printed documents.

BRIEF DESCRIPTION OF THE DRAWINGS

FIG. 1 shows an original bill of sale and a photocopy of the original bill of sale.

FIG. 2 shows the types of imperfections that can be detected in original documents and in copies of original documents at high-resolution.

FIG. 3 is a block diagram showing components of one embodiment of the present system.

DETAILED DESCRIPTION OF THE INVENTION

Figures 4, 5:
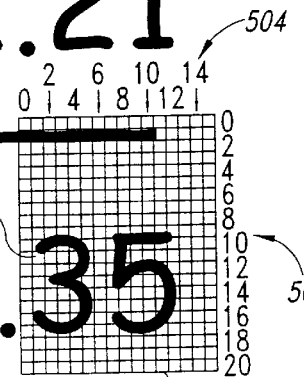
FIG. 4 shows a portion of the example document suitable for analysis.
FIG. 5 shows a grid representing a low-resolution optical scan superimposed over a portion of the region shown in FIG. 4.

The present invention provides a system for determining whether a document has been copied or duplicated by a photocopier or a laser printer. In one embodiment of the present invention, a document is optically scanned at a low-resolution and again at a high-resolution. In the high-resolution scan, small, randomly-spaced microdots of ink or toner can be detected in areas that appear to be blank or, in other words, unprinted, at low-resolution. Detection of these microdots indicates that a document has been photocopied or laser-printed.

FIG. 2 shows the types of imperfections that can be detected in original documents and in copies of original documents at high-resolution. FIG. 2 shows the original bill of sale 202 and the duplicate bill of sale 204 that were shown in FIG. 1. The lower left-hand corners of both documents 202 and 204 are shown as they might appear under 20× magnification 206 and 208. At 20× magnification, the original, offset-printed bill of sale might show one or more relatively large and irregularly-shaped imperfections 210 that are not visible to the naked eye. At 20× magnification, the photocopied or laser-printed bill of sale 208 instead contains a number of small, randomly-spaced, generally circular microdots as, for example, microdot 212. This difference between the high-resolution imperfections of original documents and photocopied or laser-printed documents is the distinguishing feature identified by the present invention in order to distinguish original documents from photocopied or laser-printed documents. Although a 20× magnification has been used in the above example, the optimum magnification, or more specifically the DPI resolution of the scanner, is directly correlated to the resolution of the printing device. For example, a document printed with a fairly high resolution device (good pi or greater) will have toner particles that are smaller (or may be smaller) than the size of the particles created by a 300 DPI laser printer. As higher resolution printers are used, higher resolution scanners will need to be employed.

FIG. 3 is a block diagram showing components of one embodiment of the present system 300. The system is composed of two main components: an optical scanning device 302 and a computer 304. The optical scanning device 302 scans an input document 306 to produce a digital, two-dimensional matrix representation (not shown) of the printed and blank regions of the scanned document 306. This matrix representation of the document is transmitted by the optical scanning device 302 through an electrical connection 308 to the computer 304. The computer 304 includes a central processing unit ("CPU") 310, memory 312, a non-volatile storage device 314, a system controller 316, and internal communications busses 318–324 through which data is transferred within the computer. The digital matrix representation of a printed document transmitted by the optical scanning device 302 passes from the external connection 308 to the internal connection 318 and is then routed by the system controller 316 either to memory 312 through internal bus 320 or to the non-volatile storage device 318 through bus 324. The digital representation can then be accessed by the CPU 310 through internal busses 320 and 322 or through internal busses 324 and 322 and processed by the CPU in order to determine whether the input document 306 is a photocopied or laser-printed duplicate or whether the document 306 is an original document. The system shown in FIG. 3 is merely one possible implementation of the present invention. The present invention may alternatively be implemented using a microprocessor connected to an optical scanning device within some more complex system as, for example, a photocopier machine. A detector other than an optical scanner might be employed in yet another implementation.

In order to distinguish a photocopied or laser-printed document from an original document, the document is analyzed to determine whether it includes the above-described microdots. This analysis involves optically scanning a portion of the document at both low-resolution and high-resolution. FIG. 4 shows a portion of the example document suitable for analysis. The small rectangular region 402 enclosed within dotted lines of the example bill of sale 404 will be used in the following discussion to demonstrate the analysis.

FIG. 5 shows a grid representing a low-resolution optical scan superimposed over a portion of the region shown in FIG. 4. A rectangular grid 502 has been superimposed over the digits "35" and a portion of the line above the digits. The rectangular grid contains 16 columns labeled 0–15 504 in a horizontal direction and 21 rows labeled 0–20 506 in a vertical direction. A pair of rectangular coordinates composed of a first horizontal coordinate corresponding to a column and a second vertical coordinate corresponding to a row identifies each cell within the grid. For example, the upper left-hand starting point of the digit "3" is located within the cell 508 having coordinates (1, 11).

The first, low-resolution optical scan of the document produces a two-dimensional matrix corresponding to the two-dimensional grid 502 shown in FIG. 5. The purpose of the low-resolution scan is to identify the blank areas that will be subsequently scanned at high resolution to detect microdots within the blank areas. The grid actually produced by optical scanning may be substantially larger than the grid shown in FIG. 5 or may be positioned differently within the document. The grid shown in FIG. 5 represents one possible result of a low-resolution optical scan of a portion of a printed document. The two-dimensional digital matrix produced by the optical scanner has indices corresponding to the horizontal and vertical coordinates of the rectangular grid 502. The two-dimensional matrix contains a numerical value for each cell of the grid corresponding to a physical location within the portion of the document scanned. Different optical scanners may produce different types of values depending on the optical reflectivity or some other physical characteristic, of the corresponding location on the surface of the document. Only a single bit is needed for each cell, or, in other words, each cell contains one of two possible valves. When the value in the matrix corresponding to the cell is "0," the position within the document corresponding to the cell has high reflectivity and is assumed to be blank or non-printed. When the value in the cell is "1," the reflectivity of the surface of the document corresponding to the cell is assumed to be low, indicating that it is covered with ink or toner. Optical scanners may produce some multiple of 8 bits for each cell in order to represent various gradations of reflectivity that compose a gray scale or a color scale. The present system can assign a threshold value below which a cell is considered to be blank or non-printed and above which a cell is considered to be covered with ink or toner, essentially transforming the multi-valued cells into two-valued cells. At low-resolution, as shown in FIG. 5, small imperfections such as microdots that are not visible to the naked eye are not detected.

Figure 6:
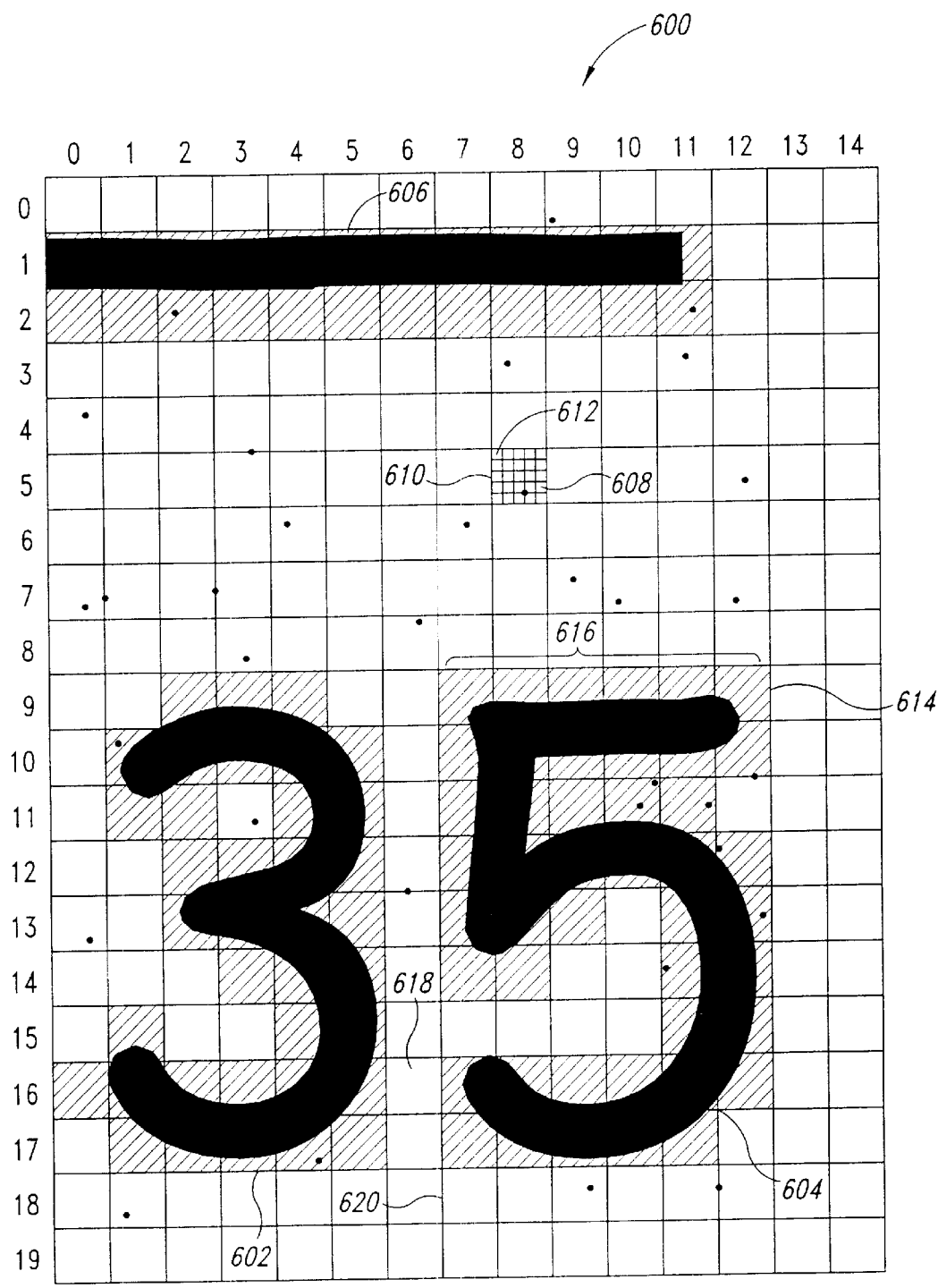
FIG. 6 illustrates a high-resolution scan of the same region scanned at low-resolution as shown in FIG. 5.

A high-resolution scan of the same region scanned at low-resolution as shown in FIG. 5 is shown in FIG. 6. The low-resolution grid is superimposed on the high-resolution scan in FIG. 6 along with the same numerical coordinates. The high-resolution scan reveals the digits "3" 603 and "5" 604 and the portion of the line above the digits 606 as detected in the low-resolution scan shown in FIG. 5. The high-resolution scan also reveals a number of microdots that were not visible in the low-resolution scan as, for example, microdot 608 within the low-resolution cell (8, 5) 610. High-resolution grid lines are shown in FIG. 6 for the low-resolution cell 610. The two-dimensional matrix that would be produced by the optical scanner to represent the high-resolution scan is based on the smaller, high-resolution grid, as shown in FIG. 6 for low-resolution cell 610, with corresponding high-resolution coordinates. For example, the high-resolution cell 612 at the upper left-hand corner of the low-resolution cell 610 would have high-resolution coordinates (40, 20).

The present system compares the low-resolution scan 502 and the high-resolution scan 600 in order to detect the microdots revealed in the high-resolution scan but absent in the low-resolution scan. In this comparison, low-resolution cells corresponding to regions of the input document that were determined to be covered by ink or toner or, in other words, low-resolution cells having the value "1" are masked out or excluded from the analysis. Low-resolution cells that are excluded from the analysis are indicated in FIG. 6 with cross-hatching, as for example, the low-resolution cell (12, 11) 614 at the upper right-hand corner of a block of masked low-resolution cells 616 that include the upper horizontal stroke of the digit "5" 604. A conservative exclusion can be obtained by setting the detection threshold value for the reflectivity of a region of the document at a relatively low value such that, for example, if more than one or two high-resolution cells that correspond to a low-resolution cell are covered with ink or toner, the low-resolution cell will have a value of "1" in the two-dimensional low-resolution matrix representation. Thus, for example, low-resolution cell (5, 16) 618 is excluded, as indicated in FIG. 6 with cross-hatched lines, because the tip of the digit "5" obscures more than one high-resolution grid cell within the low-resolution cell. In contrast, low-resolution cell (6, 18) 620 is not excluded because the small region of the digit "5" covers less than one high-resolution cell. The analysis of the high-resolution matrix representation of the input document will involve only those high-resolution matrix cells that correspond to the low-resolution cells shown in FIG. 6 without cross-hatching.

Although the embodiment explained with reference to FIGS. 3–6 performs a low resolution scan followed by a high resolution scan, it will be understood that only a high resolution scan is required. However, scanning the entire document at high resolution will generally require more time than scanning the entire document at low resolution and then scanning only a portion of the document at high resolution.

Figure 7:
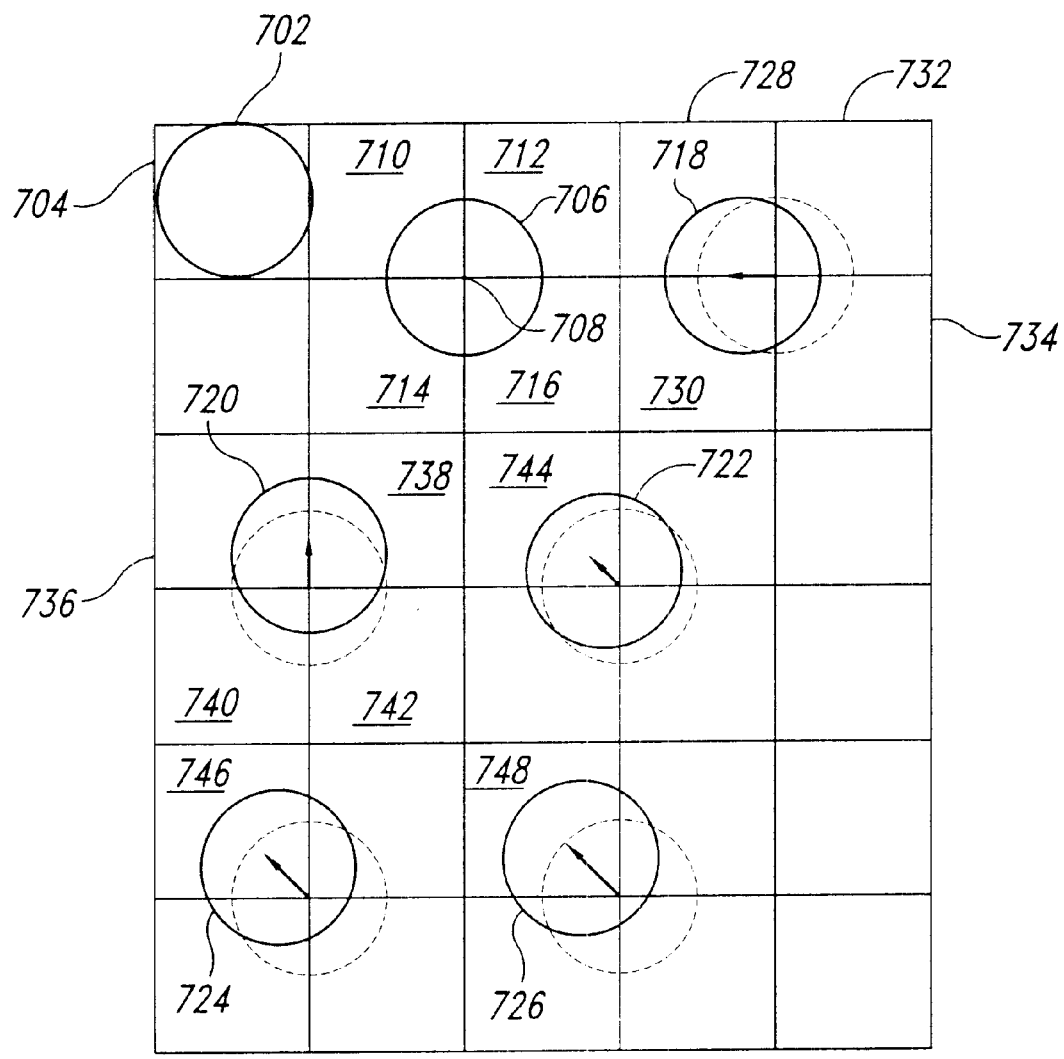
FIG. 7 shows idealized microdots positioned within a portion of a high-resolution scan grid.

FIG. 7 shows idealized microdots positioned within a portion of a high-resolution scan grid. The embodiment of the present invention described below assumes that the optical scanning device employed to produce the low-resolution and high-resolution scans provides adjustable or selectable resolution. In this case, it is desirable to adjust the resolution for the high-resolution scan so that the dimension of a grid cell roughly corresponds to the average diameter of a microdot. If an optical scanner does not provide such adjustable resolution, mathematical techniques can be employed to transform a two-dimensional matrix representation produced by the optical scanner to an appropriate resolution. Alternatively, different embodiments of the present system may be used for detecting microdots at resolutions lower or higher than this desirable resolution.

Circle 702 in FIG. 7 represents a microdot centered within the high-resolution cell 704, illustrating the approximate correspondence between the average diameter of a microdot and the dimension of the high-resolution cell. Microdot 706 is centered at the intersection of four high-resolution cells 708. Each of the four high-resolution cells that contain portions of microdot 706, 710–716 contain exactly 25% of the idealized circular microdot 706. Cell 704 contains essentially 100% of microdot 702. As will be illustrated below, it is desirable to set the reflectivity threshold for the high-resolution scan such that a cell containing more than 25% of a microdot will have a resulting scan value of "1" while a cell containing 25% or less of a microdot will have a resulting scan value of "0." Thus, cell 704 will have a scan value of "1" and the four cells 710–716 will each have a scan value of "0." The threshold is set in this way in order to ensure that, at most, only two cells that share a common side and have a scan value of "1" will correspond to a single microdot. In other words, with the threshold set to greater than 25%, a single microdot can, at most, cause two cells sharing a common side to have a value of "1." In the special case of a microdot centered at the intersection of four cells, like microdot 706, the microdot will produce no cells having a value of "1" and will thus not be detected by the high-resolution scan. In general, the centers of microdots will not coincide with the intersection of four cells, and loss of detection of the small number of microdots with centers coinciding with four-cell intersections does not impact the overall determination of whether microdots are present on the input document. Microdots 718–726 have centers slightly dislocated from intersection points of four cells in order to illustrate the fact that a microdot can cause at most two adjoining cells to have the value of "1." In the case of microdot 718, the center has been slightly translated along a cell edge to the left from the intersection point of the four cells. In this case, cell 728 and cell 730 will each contain greater than 25% of the area of microdot 718 and will thus each have a scan value of "1." Cells 732 and 734 will have less than 25% of the area of microdot 718 and will thus have scan values of "0." Thus, microdot 718 is detected in the high-resolution scan by two adjacent high-resolution cells 728 and 730 having scan values of "1." Microdot 720 is translated vertically from the intersection point of four cells resulting in cells 736 and 738 each containing greater than 25% of the total area of a microdot and thus having a scan value of "1" and high-resolution cells 740 and 742 each having less than 25% of the area of a microdot and thus having scan values of "0." Microdots 722, 724, and 726 show progressive translation of the center of the microdot in a diagonal direction from the intersection points of four high-resolution cells. In this case, the cell into which the center of the microdot is translated 744, 746, and 748, respectively, will contain greater than 25% of the total area of the microdot and the remaining three high-resolution cells that contain portions of the microdot will contain less than 25% of the microdot. Thus, when the dimension of a high-resolution cell roughly corresponds to the diameter of a microdot, a given microdot will generally cause only one high-resolution cell to have a scan value of "1" and, at most, will cause two adjacent high-resolution cells to have scan values of "1." This matching of resolution to microdot size greatly simplifies the detection algorithm to be described below. In essence, microdot detection amounts to finding single high-resolution cells, or pairs of high-resolution cells that share a common side, with scan values of "1" surrounded on all sides by high-resolution cells having scan values of "0."

Figure 8:
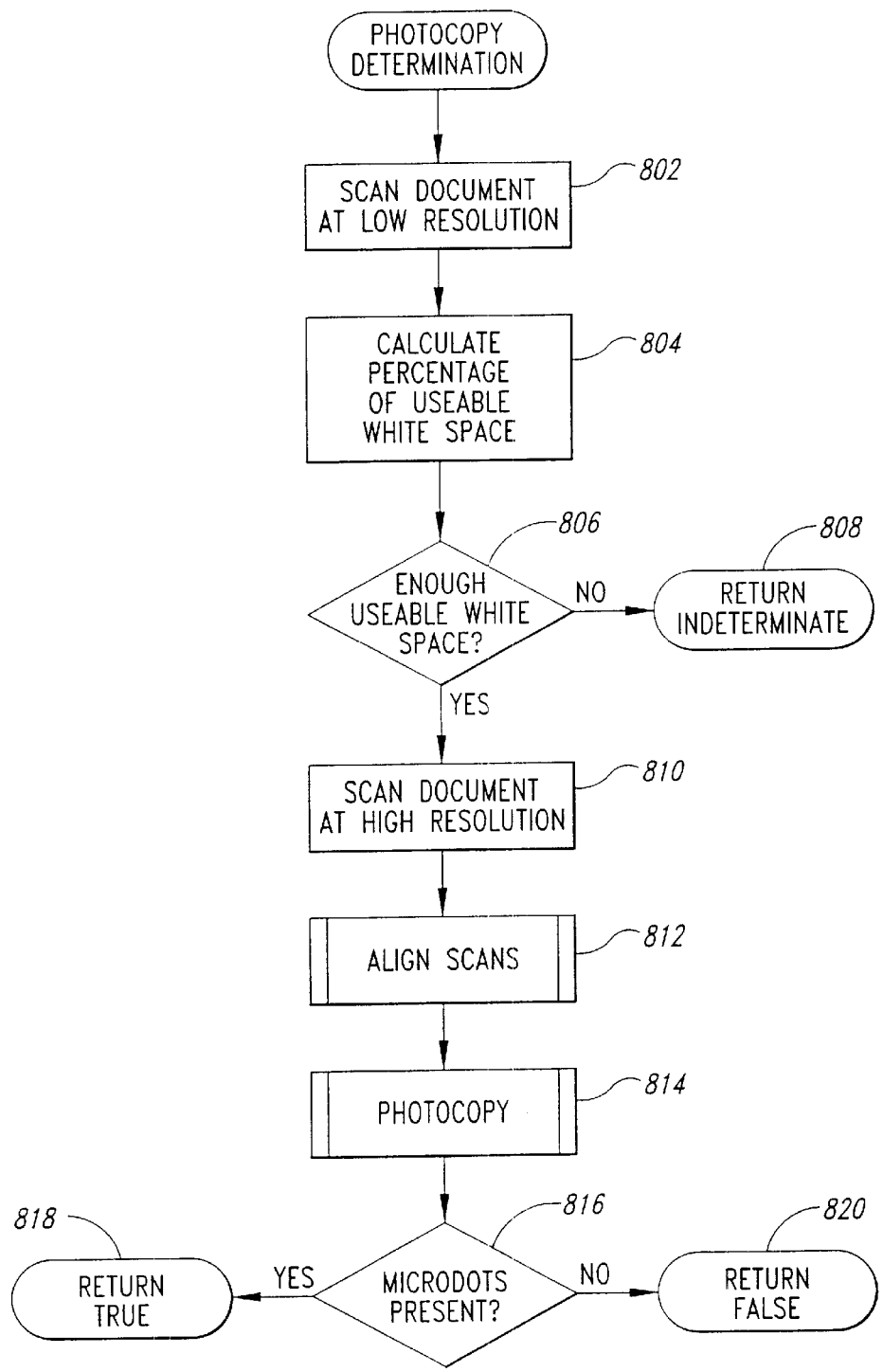
FIG. 8 is a flow control diagram for one embodiment of the present system.

FIG. 8 is a flow control diagram for one embodiment of the present system. In step 802, a portion of a document is scanned at low-resolution, as illustrated in FIG. 5. In step 804, the system determines the ratio of low-resolution cells having scan value less than some low threshold value to the total number of low-resolution cells included in the scan. In the case of a matrix having binary values, this is the ratio of low-resolution cells having the value "0" divided by the total number of low-resolution cells in the scan. In step 806, the system compares this ratio to a threshold value. When the calculated ratio is less than a threshold value, the system determines that there is not enough white or blank space within the document for analyzing the document for the presence of microdots. In this case, the system returns, in step 808, an indication that it cannot determine whether the document in question is an original document or a photocopy or a duplicate. Alternatively, the present system could try additional low-resolution scans of different portions of the document before concluding that the document contains insufficient white or blank space. If, on the other hand, the calculated ratio exceeds the threshold value, then control flows to step 810. In step 810, the system scans the same portion of the document scanned in step 802 at high-resolution.

In step 812, the system employs an alignment procedure to ensure that the two scans are properly aligned with each other, or, in other words, ensures that the coordinates or indices of the matrix representation of the high-resolution scan are fixed multiples of the indices or coordinates of the matrix representation of the low-resolution scans and that the upper, left-hand corner of the first cell in the high-resolution matrix coincides with the upper, left-hand corner of the first cell in the low-resolution matrix. An optical scanner may automatically ensure such alignment, in which case step 812 is not necessary. If alignment is necessary, it can be relatively simply achieved by calculating the center of density of the low-resolution and high-resolution scans, superimposing the two scans so that the centers of density coincide, and then translating and rotating one scan with respect to the other in order to maximize a computed correspondence between cell values of the two scans.

Once the two scans are aligned, the system, in step 814, employs a Photocopy routine to analyze the low-resolution and high-resolution matrix representations of the scans in order to detect the presence of microdots. If the result of the Photocopy routine indicates that microdots are present, as determined in step 816, then the system returns an indication that the analyzed document is a photocopied or laser-printed duplicate in step 818. Otherwise, the system returns an indication that the analyzed document is an original document in step 820.

Figure 9:
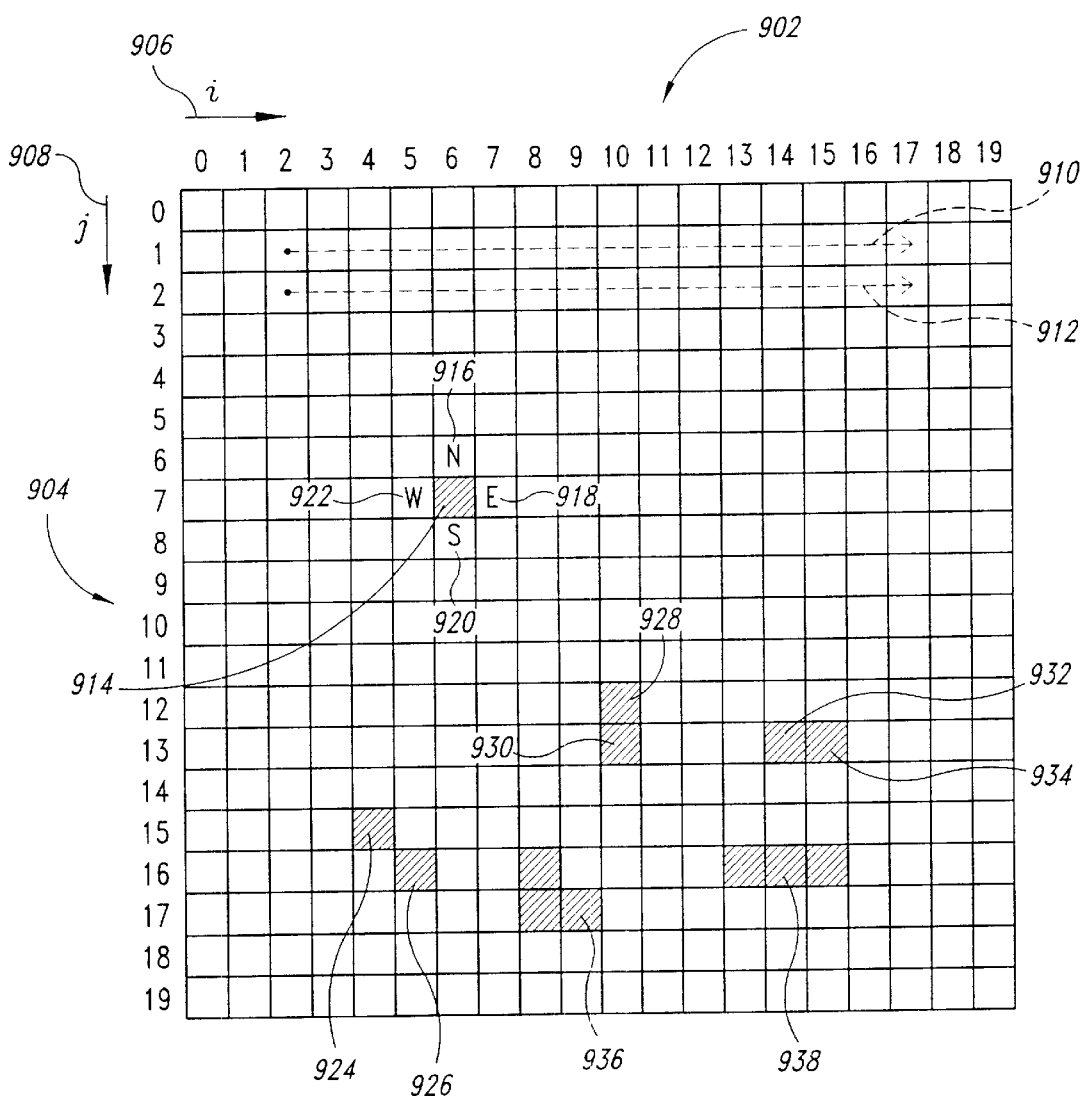
FIG. 9 illustrates operation of the routine Photocopy.

A pseudo-code implementation of the routine photocopy is shown below. FIG. 9 illustrates operation of the routine Photocopy. In the text that follows the routine Photocopy, the routine will be described with relation to FIG. 9.

```
#define THRESHOLD = 0.01;
#define MASKED (arg1, arg2) low_res[arg1/MAG, arg2/MAG]
int photocopy (int HD, int VD, int MAG, int *low_res, int *high_res)
{
    int i;
    int j;
    int one = FALSE;
    int num_masked = 0;
    int num_microdots = 0;
    double microdot_density;
    for(j = 2; j < VD - 2; j++)
    {
        for(i = 2; i < HD - 2; i++)
        {
            if (MASKED(i, j) num_masked++;
            else if (high_res[i,j])
            {
                one = FALSE;
                if (high_res[i-1, j] || MASKED(i-1, j) ||
                    high_res[i, j-1] || MASKED(i, j-1) ||
                    MASKED (i+1, j) || MASKED(i, j+1)) continue;
                if (high_res[i+1, j]
                {
                    if (high_res[i+1, j-1] || high_res[i+2, j] || high_res[i+1, j+1]) continue;
                    if (MASKED(i+1, j-1) || MASKED(i+2, j) || MASKED(i+1, j+1)) continue;
                    one = TRUE;
                }
                if (high_res[i, j+1])
                {
                    if (one) continue;
                    if (high_res[i-1, j+1] || high_res[i, j+2] || high_res[i+1, j+1]) continue;
                    if (MASKED(i-1, j+1) || MASKED(i, j+2) || MASKED(i+1, j+1)) continue;
                }
                num_microdots++;
            }
        }
    }
    microdot_density = num_microdots / (((HD-2) * (VD-2)) - num_masked);
    if (microdot_density > THRESHOLD) return TRUE;
    else return FALSE;
}
```

In line 1 of the routine Photocopy, the constant THRESHOLD is defined to be 0.01. At the end of the routine Photocopy, the density of microdots detected in a matrix representation of a scan is calculated and compared to this threshold. If the microdot density exceeds this threshold, then the routine Photocopy will return an indication that microdots have been detected. The value for this threshold must be determined by experimentation for a given optical scanner and for given low and high resolutions. Line 2 of the routine Photocopy defines a macro called MASKED. The macro takes two arguments "arg1" and "arg2" which represent the rectangular coordinates of a high-resolution matrix cell. The macro returns the value of the low-resolution matrix cell that corner points to this high-resolution matrix cell. Thus, the value returned by this macro is "1" when the low-resolution cell has a scan value of "1" and "0" when the low-resolution cell has a scan value of "0." The value "0" is equivalent to the Boolean value FALSE and the value "1" is equivalent to the Boolean value TRUE. Thus, applying this macro to the coordinates of a high-resolution cell returns a Boolean value indicating whether the high-resolution cell should or should not be considered in the microdot analysis, or, equivalently, whether or not the low-resolution matrix cell corresponding to the high-resolution matrix cell has been masked out of the analysis.

As can be seen in line 4, the routine Photocopy takes five arguments: HD, VD, MAG, LOW_RES, and HIGH_RES. HD is the horizontal dimension of the high-resolution matrix and VD is the vertical dimension of the high-resolution matrix. In the high-resolution matrix 900 shown in FIG. 9, HD would have the value 20 and VD would also have the value 20, corresponding to the 20 columns 902 and 20 rows 904 of the high-resolution matrix. The argument MAG is the magnification factor between the low-resolution and high-resolution scans. Taking the low-resolution and the high-resolution scans of FIGS. 5 and 6 as an example, the magnification factor would be 5 since there are five high-resolution cells in a horizontal direction and five high-resolution cells in a vertical dimension along the horizontal and vertical edges of a single low-resolution cell. The argument low_res is a pointer to the two-dimensional matrix representation of a low-resolution scan and the argument high_res is a pointer to a two-dimensional matrix representation of a high-resolution scan. In both cases, each cell of the matrix is represented by an integer value. Blank or white space is indicated by a value of "0," and printed or toner-impregnated areas are indicated by a value of "1."

The six local variables used in the routine Photocopy are declared in lines 6–11. The integer variables "i" and "j" correspond to the horizontal and vertical rectangular coordinates of matrix cells, as indicated by the directional arrows 906 and 908 of FIG. 9. The integer variable "num_masked" is used in Photocopy to accumulate the number of masked high-resolution cells. The variable "num_microdots" is used to accumulate the number of microdots detected by Photocopy. The variable "microdot_density" is used to hold a calculated value of the number of microdots detected per the number of unmasked high-resolution cells analyzed.

The bulk of the analysis, in which the variables "num_masked" and "num_microdots" accumulate the number of masked cells and the number of detected microdots, respectively, occurs within two nested "for" loops on lines 13–39. The effect of the nested "for" loops is to analyze, one by one, cells within the high-resolution scan. The analysis proceeds as indicated by the dotted arrows 910 and 912 in FIG. 9. Starting with cell (2, 2), each successive cell in the horizontal direction is considered up through cell (17, 2). Then analysis begins on the next row at cell (2, 3) and again proceeds one-by-one in a horizontal direction. The cells within two vertical and two horizontal margins along the edge etches of the high-resolution matrix are not included in the analysis.

The code included in lines 17–36 is applied, in succession, to each of the analyzed cells. Within this code, the cell being analyzed is designated as "high_res[i, j]." On line 17, the macro MASKED is applied to cell (i, j) to determine whether the currently analyzed cell should be included in the microdot analysis. If the macro MASKED returns a value of "1," or TRUE, the variable "num_masked" is incremented to indicate detection of another masked cell and the remaining lines of the nested "for" loops 18–36 are skipped for cell (i, j). If cell (i, j) is not masked, then, in the "if" statement on line 18, Photocopy determines whether the cell (i, j) indicates detection of ink or toner. If not, cell (i, j) cannot represent a microdot, and the remaining lines 17–36 of the nested "for" loops are skipped for cell (i, j).

The variable "one" is set to FALSE on line 20 to indicate that no adjoining cells with the value of "1" have yet been detected for cell (i, j). In the "if" statement beginning on line 21 and extending through line 23, adjacent neighbors of cell (i, j) are examined for certain characteristics that will exclude cell (i, j) from further analysis. An example cell (i, j) 914 with i=6 and j=7 is shown in FIG. 9. This example cell has four adjacent neighboring cells, a north neighbor 916, an east neighbor 918, a south neighbor 920 and a west neighbor 922. If any of these adjacent neighboring cells are masked or if the north or west neighbor have values of "1," cell (i, j) will not be further considered. High-resolution cells adjacent to masked cells are not considered because it is possible that they represent extensions of features visible to the naked eye and detected in the low-resolution scan. If either the north or west adjacent neighbor has a value of "1," then cell (i, j) has already been considered in the analysis in a previous iteration of the nested "for" loops and need not be reconsidered. Thus, if cell (i, j) does not have masked neighbors and was not previously considered, the analysis continues at line 24. Otherwise, lines 24–36 are skipped and Photocopy continues with the analysis of a subsequent cell.

At this point in the analysis, cell (i, j) has been determined to be a candidate microdot. The remaining code in lines 24–37 is directed to determining whether this candidate cell has more than one adjacent neighboring cell that also has a value of "1." If so, as discussed above and illustrated in FIG. 7, then cell (i, j) cannot be considered to be a microdot because it will have dimensions greater than a microdot. If the candidate cell (i, j) has no adjacent neighbor with a scan value of "1" or has only one adjacent neighbor with the scan value of "1," then cell (i, j) is assumed by Photocopy to represent a detected microdot. If the east neighbor has a value of "1" and the east neighbor has no masked adjacent neighbors and has no adjacent neighbors with a value of "1," then variable "one" is set to TRUE on line 28. If the east neighbor has a value of "0," then the variable "one" remains FALSE, as initialized in line 20.

A similar analysis is conducted in lines 30–35 for the south neighbor of the candidate cell (i, j). If the south neighbor has a value of "1," and the east neighbor was detected to have a value of "1," then candidate cell (i, j) has two adjacent neighbors with the value of "1" and cannot be considered as a microdot. Thus, further analysis for cell (i, j) is skipped. If the east neighbor does not have a value of "1," and the south neighbor does have a value of "1" but also has an additional adjacent neighbor that is either masked or has a value of "1," then candidate cell (i, j) cannot be considered to be a microdot. If execution reaches line 36, then candidate cell (i, j) has been determined to be a microdot and the variable "num_microdots" is incremented to indicate that another microdot has been detected. Once all the possible candidate cells have been analyzed within the nested four loops, the microdot density is calculated on line 40 as the sum of the number of microdots detected divided by the number of unmasked cells within the high-resolution matrix. If the microdot density exceeds the threshold value, then, on line 41, Photocopy returns TRUE, indicating that microdots have been detected. Otherwise, Photocopy returns a value of FALSE on line 42.

Referring to FIG. 9, cells 914, 924, and 926 would each be determined to be a separate microdot by the analysis of the routine Photocopy. Cells 928 and 930 would be together determined to be a single microdot and likewise cells 932 and 934 would be together determined to be a single microdot. The two blocks of three contiguous cells 936 and 938 would not be determined to be microdots by the Photocopy.

Thus, the above-described implementation compares a low-resolution scan and a high-resolution scan of the same portion of a document with appropriately set thresholds for each scan. The low-resolution scan is used to mask out cells of the high-resolution scan from analysis so that features appearing visible to the naked eye are not considered in the microdot analysis. The unmasked regions of the high-resolution scan are then analyzed to detect the presence of single cells or pairs of cells having the value of "1" surrounded by cells having the value "0," or, in other words, discrete spots within the high-resolution scan that were not detected at low-resolution. The presence of such spots indicates the presence on the surface of the document of microdots, characteristic of photocopied or laser-printed documents.

Although the present invention has been described in terms of one embodiment, it is not intended that the invention be limited to this embodiment. Modification within the spirit of the invention will be apparent to those skilled in the art. For example, the present invention can be implemented either as a stand-alone system as shown in FIG. 3, or as a microprocessor and scanning apparatus embedded within a more complex system such as a photocopier. A variable-resolution scanner can be employed in order to produce a high-resolution scan with grid dimensions approximately equal to the average diameter of a microdot or, conversely, a scanner having fixed resolutions can be used and the resulting matrix representation transform mathematically to produce an equivalent resolution with grid dimensions equal to the average diameter of a microdot. Alternatively, a more complex implementation of the routine Photocopy may be employed to analyze a high-resolution scan where the diameter of a microdot exceeds the grid dimensions. In such a complex implementation, the matrix representation of the scan document would need to be examined for discrete spots comprising multiple cells having scan values of "1" surrounded by regions of cells having scan values of "0." Alternative methods for detecting the presence of ink or toner on the surface of a document other than optical scanning could be employed to generate the matrix representation of a portion of the surface of the document. Many different implementations of the routine Photocopy are possible. The scope of the present invention is defined by the claims that follow.

What is claimed is:

1. A system for determining whether a document has been created by photocopying or laser printing, the system comprising:
   a detector that detects randomly spaced microdots produced during photocopying and laser printing on the surface of a document; and
   an output device that, in response to detection by the detector of microdots produced during photocopying and laser printing on the surface of a document, outputs an indication that the document has been created by photocopying or laser printing.

2. The system of claim 1 wherein the detector further comprises:
   an optical scanner that measures the reflectivity of a portion of the surface of the document, the result of measurement of the reflectivity of the surface of the document output as a scan; and
   a computing device that identifies and counts indications of microdots within the scan, that compares the count of microdots to a threshold value, and that outputs to the output device an indication that the document has been created by photocopying or laser printing when the count of microdots exceeds the threshold value.

3. The system of claim 2 wherein:
   the optical scanner measures the reflectivity of the portion of the surface of the document at low resolution to produce a low-resolution scan in which microdots are not detectable; and
   the optical scanner measures the reflectivity of the surface of the area of the document at high resolution to produce a high-resolution scan in which microdots are detectable.

4. A system for determining whether a document has been created by photocopying or laser printing, the system comprising:
   a detector that detects randomly spaced microdots produced during photocopying and laser printing on the surface of a document, wherein the detector further comprises:
      an optical scanner that measures the reflectivity of a portion of the surface of the document, the result of measurement of the reflectivity of the surface of the document output as a scan, wherein:
         the optical scanner measures the reflectivity of the portion of the surface of the document at low resolution to produce a low-resolution scan in which microdots are not detectable; and
         the optical scanner measures the reflectivity of the surface of the area of the document at high resolution to produce a high-resolution scan in which microdots are detectable; and
   a computing device that identifies and counts indications of microdots in that portion of the high-resolution scan that corresponds to those portions of the low-resolution scan in which the measured reflectivity does not indicate the presence of ink, toner, and other printing, that compares the count of microdots to a threshold value, and that outputs to the output device an indication that the document has been created by photocopying or laser printing when the count of microdots exceeds the threshold value; and
   an output device that, in response to detection by the detector of microdots produced during photocopying and during laser printing on the surface of a document, outputs an indication that the document has been created by photocopying or laser printing.

5. The system of claim 4 wherein the computing device identifies microdots as small regions within the high-resolution scan that differ in reflectivity from the reflectivity of unprinted regions of the document.

6. The system of claim 5 wherein the high-resolution scan comprises a high-resolution matrix having cells that each contain a value that indicates the reflectivity at a corresponding position on the surface of the document, the area of the surface of the document corresponding to each cell of the high-resolution matrix approximately equal to the area of a microdot.

7. The system of claim 6 wherein the computing device identifies as an indication of a microdot a high-resolution matrix cell having a value indicating a reflectivity corresponding to ink or toner adjoining on all sides high-resolution matrix cells having values indicating a reflectivity corresponding to an unprinted surface of the document.

8. The system of claim 6 wherein the computing device identifies as an indication of a microdot two high-resolution matrix cells, adjoined along a common side, having values indicating a reflectivity corresponding to ink and toner, and adjoining on all sides other than the common side high-resolution matrix cells having a value indicating a reflectivity corresponding to an unprinted surface of the document.

9. A system for determining whether a document on which one or more images have been created has been printed by photocopying or laser printing, the system comprising:

a scanning device that scans a portion the document at low resolution to produce a low-resolution scan and that scans the blank areas of the document at high resolution to produce a high-resolution scan; and a computing device that analyzes the low-resolution scan to identify blank areas of the document on which the one or more of the images have not been created and that analyzes the high-resolution scan to detect microdots produced during photocopying and laser printing.

10. The system of claim 9 wherein the low-resolution scan comprises a low-resolution matrix having cells, each cell containing a value that indicates presence or absence of microdots produced during photocopying and laser printing at a position on the document corresponding to the cell and wherein the high-resolution scan comprises a high-resolution matrix having cells, each cell containing a value that indicates presence or absence of substances employed in photocopying and laser printing at a position on the document corresponding to the cell.

11. The system of claim 10 wherein an area of the document corresponding to one high-resolution matrix cell is approximately equal to the area of a microdot.

12. The system of claim 11 wherein the computing device identifies microdots produced during photocopying and laser printing by identifying high-resolution matrix cells that have a value that indicates presence of toner or other substances employed in photocopying and laser printing and that share common sides with adjoining high-resolution matrix cells that all have values that indicate absence of toner or other substances employed in photocopying and laser printing.

13. The system of claim 12 wherein the computing device identifies microdots produced during photocopying and laser printing by identifying pairs of high-resolution cells that share a common side, that have lower reflectivity values, and that adjoin on all sides other than the common shared side high-resolution cells that all have lower reflectivity values.

14. A system for determining whether a document was produced by photocopying or laser-printing, the system comprising:

a scanning device that scans an area of the document for the presence of substances that differ in reflectivity from a background reflectivity of the document at a resolution sufficient to detect microdots characteristic of photocopied or laser-printed documents;

a computing device that analyzes an area of the scanned area to count the number of microdots within the analyzed area, that computes a value based on the number of microdots counted, and that compares the computed value to a threshold value; and an output to which the computing device outputs an indication that the document was produced by photocopying or laser-printing when the computed value exceeds the threshold value and to which the computing device outputs an indication that the document was not produced by photocopying or laser-printing when the computed value is equal to or less than the threshold value.

15. The system of claim 14 wherein the computed value is the number of microdots within the analyzed area divided by the size of the analyzed area and the threshold value is a threshold density of microdots.

16. The system of claim 14 wherein the scanning device is an optical scanner that measures the reflectivity of the surface of the document.

17. A system for determining whether a document was produced by photocopying or laser-printing, the system comprising:

a scanning device that scans an area of the document for the presence of substances that differ in reflectivity from a background reflectivity of the document at a resolution sufficient to detect microdots characteristic of photocopied or laser-printed documents;

a computing device that analyzes an area of the scanned area to count the number of microdots within the analyzed area, that computes a value based on the number of microdots counted, and that compares the computed value to a threshold value; and an output to which the computing device outputs an indication that the document was produced by photocopying or laser-printing when the computed value exceeds the threshold value and to which the computing device outputs an indication that the document was not produced by photocopying or laser-printing when the computed value is equal to or less than the threshold value, wherein the scanning device scans the area of the document for the presence of substances at a lower resolution at which microdots are not detectable and the computing device analyzes that portion of the area at high resolution that corresponds to those areas of the low resolution scan on which the presence of a substance was not detected.

18. The system of claim 17 wherein the scanning device, after scanning the area of the document for the presence of substances at low resolution, produces a low-resolution matrix having cells that each contain a value that indicates the presence or absence of a substance at corresponding position on the surface of the document and wherein the scanning device, after scanning the area of the document for the presence of substances at high resolution, produces a high-resolution matrix having cells that each contain a value that indicates that the presence or absence of a substance at corresponding position on the surface of the document.

19. The system of claim 18 wherein the resolution of the high-resolution scan is chosen so that a dimension of the area of the surface of the document corresponding to a cell of the high-resolution matrix is approximately equal to the average diameter of a microdot and wherein analyzing that portion of the area at high resolution that corresponds to those areas of the low resolution scan on which the presence of a substance was not detected further includes:

initializing a count of detected microdots to 0;

successively choosing each unanalyzed cell within a portion of cells of the high-resolution matrix for analysis; and when the value of the chosen cell indicates presence of a substance and the value of the cell of the low-resolution matrix that corresponds to the chosen cell indicates absence of a substance and the chosen cell has at most one adjacent high-resolution cell with a value indicating presence of a substance and has no additional adjacent high-resolution cells with a value indicating presence of a substance, determining that the chosen cell and the at most one adjacent cell comprise an indication of a microdot and incrementing the count of detected microdots by one.

20. A system for detecting small discreet microdots produced during photocopying and laser printing on the surface of a document, the system comprising:

a scanning device that scans a portion the document at low resolution to produce a low-resolution matrix, each cell of the low-resolution matrix corresponding to a discrete low-resolution region on the surface of the document and having a value that indicates whether a photocopying or laser printing substance was detected on that region of the document, the discrete low-resolution region on the surface sufficiently large, and the threshold for substance detection sufficiently high, that a presence of a number of microdots within a discrete low-resolution region otherwise free of photocopying or laser printing substances is not detected, the scanning device also scanning the portion the document at high resolution to produce a high-resolution matrix, each veil of the high-resolution matrix corresponding to a discrete high-resolution region on the surface of the document smaller than a discrete low-resolution region corresponding to a low-resolution matrix cell and having a value that indicates whether a photocopying or laser printing substance was detected on the high-resolution region of the document, a high-resolution region sufficiently small, and the threshold for substance detection sufficiently low, that a presence of a number of microdots within a discrete high-resolution region otherwise free of photocopying or laser printing substances is detected; and a computing device that compares the low-resolution matrix to the high-resolution matrix in order to detect indications of microdots.

21. The system of claim 20 wherein a dimension of the high-resolution region is approximately equal to the average diameter of a microdot.

22. The system of claim 21 wherein the low-resolution and high-resolution matrices are aligned by the computing device so that the upper left-hand portion of the portion of the document corresponding to the first cell of the low-resolution matrix corresponds to first element of the high-resolution matrix and so that the portion of the document represented by the low-resolution matrix is equal to the portion of the document represented by the high-resolution matrix, each cell of the low-resolution matrix corresponding to a number of cells of the high-resolution matrix.

23. The system of claim 22 wherein the computing device compares the low-resolution matrix to the high-resolution matrix by:

choosing as a candidate cell each successive, unanalyzed cell of a contiguous set of cells within the high-resolution matrix that has a value indicating detection of a photocopying or laser printing substance and that corresponds to a low-resolution matrix cell that has a value indicating that a photocopying or laser printing substance was not detected; and for each candidate cell,
when the candidate cell has one adjoining, unanalyzed cell that has a value indicating detection of a photocopying or laser printing substance and that corresponds to a low-resolution matrix cell that has a value indicating that a photocopying or laser printing substance was not detected and when the adjoining cell has no adjoining cells in addition to the candidate cell that have a value indicating detection of a photocopying or laser printing substance, analyzing the candidate cell and the one adjoining cell together as a candidate microdot; and when the candidate cell has no adjoining cells that have a value indicating detection of a photocopying or laser printing substance, analyzing the candidate cell as a candidate microdot.

24. The system of claim 23 wherein analysis of a candidate microdot by the computing device comprises:

determining whether any cell adjoining the candidate microdot correspond to a low-resolution matrix cell that has a value indicating detection of a photocopying or laser printing substance;

when no cell adjoining the candidate microdot corresponds to a low-resolution matrix cell that has a value indicating detection of a photocopying or laser printing substance, determining that the candidate microdot is an indication of a microdot; and when a cell adjoining the candidate microdot corresponds to a low-resolution matrix cell that has a value indicating detection of a photocopying or laser printing substance, determining that the candidate microdot is not an indication of a microdot.

25. The system of claim 20 wherein the scanning device is an optical scanner that measures the reflectivity of the surface of the document.

26. The system of claim 17 wherein the computed value is the number of microdots within the analyzed area divided by the size of the analyzed area and the threshold value is a threshold density of microdots.

27. The system of claim 17 wherein the scanning device is an optical scanner that measures the reflectivity of the surface of the document.

28. A system for determining whether a document was produced by photocopying or laser-printing, the system comprising:

a scanning device for scanning a blank area of a document;

a computing device for analyzing said blank area a resolution sufficient to detect microdots characteristic of photocopying and laser printing to determine whether such microdots are present in the blank area;

an output to which the computing device outputs an indication that the document was produced by photocopying if a value representative of the number of microdots present in the blank area is greater than a threshold value.

29. The system of claim 28 wherein the threshold is representative of the number of microdots per unit area and wherein the value representative of the number of microdots detected is equal to the number of microdots detected divided by the area of the blank area.

30. The system of claim 28 wherein scanning of a blank area of a document is accomplished by employing an optical scanner that measures the reflectivity of the surface of the document.

* * * * *

UNITED STATES PATENT AND TRADEMARK OFFICE
CERTIFICATE OF CORRECTION

PATENT NO. : 6,571,001 B2 Page 1 of 3
DATED : May 27, 2003
INVENTOR(S) : Stephen C. Murphy It is certified that error appears in the above-identified patent and that said Letters Patent is hereby corrected as shown below:

Column 4,
Line 17, "first, low-resolution" should read -- first low-resolution --
Line 35, "characteristic, of the" should read -- characteristic of the --
Line 37, "possible valves." should read -- possible values. --

Columns 7-8,
Table at line 3, "(int HID, int VD," should read -- (int HD, int VD, --
Table at lines 21-58,

"

```
#define THRESHOLD = 0.01;
#define MASKED (arg1, arg2) low_res(arg1/MAG, arg2/MAG)
int photocopy (int HID, int VD, int MAG, int *low_res, int *high_res)
{
    int i;
    int j;
    int one = FALSE;
    int num_masked = 0;
    int num_microdots = 0;
    double microdot_density;
    for(j = 2; j < VD - 2; j++)
    {
        for(i = 2; i < HD - 2; i++)
        {
            if (MASKED(i, j) num_masked++;
            else if (high_res[i,j])
            {
                one = FALSE;
                if (high_res[i-1, j] | MASKED(i-1, j) |
                    high_res[i, j-1] | MASKED(i, j-1) |
                    MASKED (i+1, j) | MASKED(i, j+1)) continue;
                if (high_res[i+1, j])
                {
                    if (high_res[i+1, j-1] | high_res[i+2, j] | high_res[i+1, j+1]) continue;
                    if (MASKED(i+1, j-1) | MASKED(i+2, j) | MASKED(i+1, j+1)) continue;
                    one = TRUE;
                }
                if (high_res[i, j+1])
                {
                    if (one) continue;
                    if (high_res[i-1, j+1] | high_res[i, j+2] | high_res[i+1, j+1]) continue;
                    if (MASKED(i-1, j+1) | MASKED(i, j+2) | MASKED(i+1, j+1)) continue;
                }
                num_microdots++;
            }
        }
    }
    microdot_density = num_microdots / (((HD-2) * (VD-2)) - num_masked);
    if (microdot_density > THRESHOLD) return TRUE;
    else return FALSE;
}
```

" should read

UNITED STATES PATENT AND TRADEMARK OFFICE
CERTIFICATE OF CORRECTION

PATENT NO. : 6,571,001 B2
DATED : May 27, 2003
INVENTOR(S) : Stephen C. Murphy

It is certified that error appears in the above-identified patent and that said Letters Patent is hereby corrected as shown below:

Columns 7-8 (cont'd),

```
1   #define THRESHOLD = 0.01;
2   #define MASKED (arg1, arg2) low_res[arg1/MAG, arg2/MAG]
3
4   int photocopy (int HD, int VD, int MAG, int *low_res, int *high_res)
5   {
6       int i;
7       int j;
8       int one = FALSE;
9       int num_masked = 0;
10      int num_microdots = 0;
11      double microdot_density;
12
13      for (j = 2; j < VD - 2; j++)
14      {
15         for (i = 2; i < HD - 2; i++)
16         {
17            if (MASKED(i, j) num_masked++;
18            else if (high_res[i,j])
19            {
20               one = FALSE;
21               if (high_res[i-1, j] || MASKED(i-1, j) ||
22                  high_res[i, j-1] || MASKED(i, j-1) ||
23                  MASKED (i+1, j) || MASKED(i, j+1)) continue;
24               if (high_res[i+1,j]
25               {
26                  if (high_res[i+1, j-1] || high_res[i+2, j] || high_res[i+1, j+1]) continue;
27                  if (MASKED(i+1, j-1) || MASKED(i+2, j) || MASKED(i+1, j+1)) continue;
28                  one = TRUE;
29               }
30               if (high_res[i, j+1])
31               {
32                  if (one) continue;
33                  if (high_res[i-1, j+1] || high_res[i, j+2] || high_res[i+1, j+1]) continue;
34                  if (MASKED(i-1, j+1) || MASKED(i, j+2) || MASKED(i+1, j+1)) continue;
35               }
36               num_microdots++;
37            }
38         }
39      }
40      microdot_density = num_microdots / (((HD-2) * (VD-2)) - num_masked);
41      if (microdot_density > THRESHOLD) return TRUE;
42      else return FALSE;
43  }
```

UNITED STATES PATENT AND TRADEMARK OFFICE
CERTIFICATE OF CORRECTION

PATENT NO. : 6,571,001 B2
DATED : May 27, 2003
INVENTOR(S) : Stephen C. Murphy

It is certified that error appears in the above-identified patent and that said Letters Patent is hereby corrected as shown below:

Column 11,
Line 39, "transform mathematically" should read -- transformed mathematically --

Column 13,
Line 17, "portion the document" should read -- portion of the document --

Column 14,
Line 47, "substance at corresponding" should read -- substance at a corresponding --
Line 52, "indicates that the presence" should read -- indicates the presence --
Line 53, "corresponding position" should read -- a corresponding position --

Column 16,
Line 18, "microdot correspond to" should read -- microdot corresponds to --
Line 47, "blank area a" should read -- blank area at a --

Signed and Sealed this

Ninth Day of November, 2004

JON W. DUDAS
*Director of the United States Patent and Trademark Office*